(12) United States Patent
Chen et al.

(10) Patent No.: US 7,061,414 B2
(45) Date of Patent: Jun. 13, 2006

(54) OPTICAL DIGITAL-TO-ANALOG CONVERTER

(75) Inventors: Young-Kai Chen, Berkeley Heights, NJ (US); Andreas Leven, Gillette, NJ (US); Kun-Yii Tu, Summit, NJ (US)

(73) Assignee: Lucent Technologies Inc., Murry Hill, NJ (US)

( * ) Notice: Subject to any disclaimer, the term of this patent is extended or adjusted under 35 U.S.C. 154(b) by 0 days.

(21) Appl. No.: 10/771,089

(22) Filed: Feb. 3, 2004

(65) Prior Publication Data

US 2005/0168364 A1 Aug. 4, 2005

(51) Int. Cl.
*H03M 1/66* (2006.01)
(52) U.S. Cl. .................................. 341/137; 250/214 R
(58) Field of Classification Search ................ 341/137; 250/214 R, 227.14
See application file for complete search history.

(56) References Cited

U.S. PATENT DOCUMENTS

| | | | | |
|---|---|---|---|---|
| 4,288,785 | A * | 9/1981 | Papuchon et al. | 341/111 |
| 4,613,204 | A * | 9/1986 | Verber et al. | 385/10 |
| 5,039,988 | A * | 8/1991 | Hong | 341/137 |
| 5,303,079 | A * | 4/1994 | Gnauck et al. | 398/182 |
| 6,175,672 | B1 * | 1/2001 | Newberg et al. | 385/24 |
| 6,661,361 | B1 * | 12/2003 | Lewis et al. | 341/137 |
| 2003/0058504 | A1 | 3/2003 | Cho | |

FOREIGN PATENT DOCUMENTS

JP          57092320 A  *  6/1982

OTHER PUBLICATIONS

Lewis, R. et al., 8-bit Optical D/A Converter, Electronics Letters, Feb. 2, 1989, vol. 25, No. 3 pp. 200-202.*
Saida, T. et al., Integrated Optical Digital-to-Analogue Coverter and Its Application to Pulse Pattern Recognition, Electronics Letters, Sep. 27, 2001, vol. 37, No. 20, pp. 1237-1238.*
Leven, A. et al. (5), A 12.5 GSample/s Optical Digital-to-Analog Converter with 3.8 Effective Bits, 17th Annual Meeting-IEEE Lasers and Electro-Optics Society (LEOS 2004), Nov. 8, 2004, vol. 1, pp. 270-271.*
Yacoubian, et al. "Digital-To-Analog Conversion Using Electrooptic Mudulators", IEEE Photonics Technology Letters, IEEE Inc., New York, vol., 15, No. 1, Jan. 2003; pp. 117-119.

(Continued)

*Primary Examiner*—Howard L. Williams

(57) ABSTRACT

An optical digital-to-analog conversion is realized by employing either a continuous wave or pulsed laser optical signal. The laser optical signal is split into a plurality of mutually coherent optical beams, which are phase shift modulated by bits of a digital data sequence to be converted to an analog signal. The phase shift modulated optical beams are recombined to realize the desired digital-to-analog converted optical signal.

20 Claims, 4 Drawing Sheets

OTHER PUBLICATIONS

Leven, et al., "Microwave Photonic Vector 1-10 Modulator", Leos 2003, 16th Annual Meeting of the IEEE Lasers & Electro-Optics Society, Tucson, Arizona, Oct. 27-28, 2003; and Electro-Optics Society, New York, New York. vol.. vol. 1 of 2. Oct. 26, 2003: pp. 935-936.

Saida, et al., "Integrated Optical Digital-To-Analogue Converter and Its Application to Pulse Pattern Recognition", Electronics Letters, IEE Stevenage, GB, vol. 37, No. 20, Sep. 27, 2001, pp. 1237-1238.

* cited by examiner

US 7,061,414 B2

OPTICAL DIGITAL-TO-ANALOG CONVERTER

GOVERNMENT CONTRACT

The Government has a paid-up license in this invention and the right in limited circumstances to require the patent owner to license others on reasonable terms as provided for by the terms of Contract No. MDA972-03-C-0046 awarded by DARPA.

RELATED APPLICATIONS

U.S. patent application Ser. No. 10/133,469 was filed on Apr. 26, 2002, and U.S. patent application Ser. No. 10/674,722 was filed on Sep. 3, 2003.

TECHNICAL FIELD

This invention relates to optical waveform generation systems and, more particularly, to conversion of digital signals into analog optical signals.

BACKGROUND OF THE INVENTION

Digital-to-analog (D/A) converters are key elements in both electronic and photonic signal processing and data transmission. In many optical transmission systems, digital data has to be converted to analog form for processing and/or transmission. Indeed, there are many advantages for using optical technology to implementing D/A converters, for example, high-speed clocking and signal sampling, wide-bandwidth, light-weight components and the like. Additionally, a high-speed arbitrary analog waveform generator can be implemented using a very high-speed D/A converter.

One such optical D/A converter is described in an article entitle "Digital-to-Analog Conversion Using Electrooptic Modulators", authored by A. Yacoubian et al., *IEEE Photonics Technology Letters*, Vol. 15, No. 1, January 2003, pages 117–119. However, the disclosed implementation is limited to a so-called 2-bit photonic D/A converter.

SUMMARY OF THE INVENTION

These and other problems and limitations of prior known optical modulation arrangements are overcome in applicants' unique invention by utilizing a continuous wave or pulsed laser optical signal, which is split into a plurality of mutually coherent optical beams. Each of the plurality of optical beams is phase shift modulated by bits (control signals) of a data sequence to generate a corresponding plurality of phase shift modulated mutually coherent optical signals. The modulated optical signals are recombined to form the desired digital-to-analog converted optical signal for use as desired.

In one specific embodiment of the invention, the phase modulation is effected by splitting optical signal comprising a continuous wave laser optical signal into a plurality of similar mutually coherent optical signals, phase shift modulating the continuous wave optical coherent signal of each of the similar continuous wave laser optical signals with the digital data bits (control signals). Then, the plurality of phase shifted modulated continuous wave optical signals are combined to yield the resulting converted digital-to-analog signal.

In another embodiment of the invention, the supplied digital data sequence is preprocessed via a processor before the data bits of the sequence are supplied to modulate the plurality of mutually coherent versions of the supplied continuous wave laser optical signal.

In yet another embodiment of the invention, a pulsed laser signal is supplied as an input to the optical digital-to-analog converter. The pulsed laser optical signal is split into a plurality of mutually coherent optical beams, which are phase shift modulated by data sequences stored in a memory to generate a substantially jitter free analog optical signal after the phase shift modulated optical beams are recombined. The pulsed laser optical signal is controlled to have the same repetition rate as the data sequence from the memory unit. By properly aligning the data sequence with the pulses of the pulsed laser optical signal, the effect of timing jitter is canceled.

In still another embodiment of the invention, instead of stacking more phase shift modulators in a single stage digital-to-analog converter, a plurality of digital-to analog converter stages having fewer phase shift modulators are cascaded to form the over all digital-to-analog converter, in accordance with the invention. This embodiment of the invention is advantageous to realize a desired distribution of discrete output levels.

DETAILED DESCRIPTION OF EMBODIMENTS OF THE INVENTION

Figure 1:
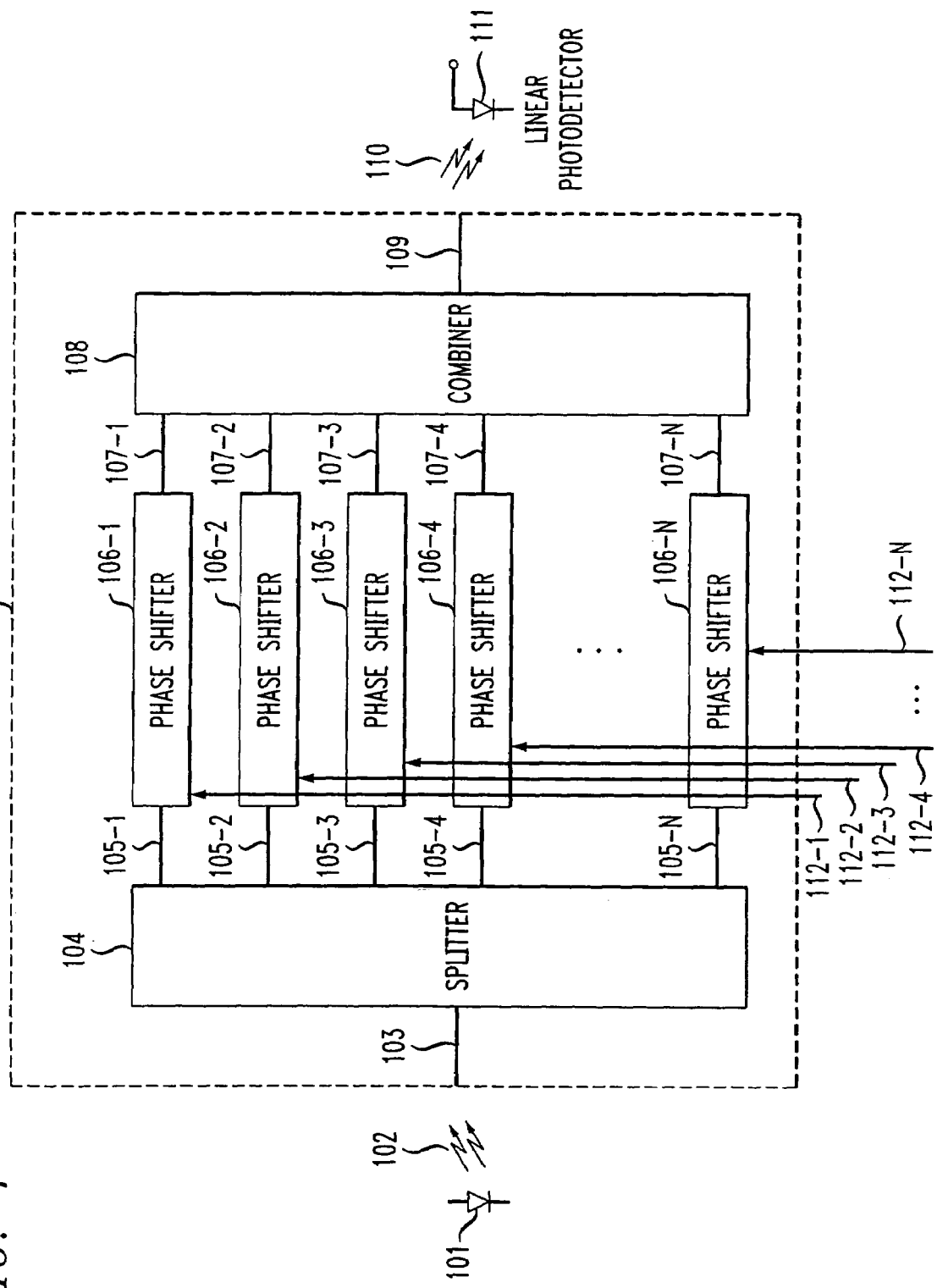
FIG. 1 shows, in simplified block diagram form, one embodiment of the invention.

FIG. 1 shows, in simplified block diagram form, one embodiment of the invention. Specifically, shown is optical light source 101 typically including a continuous wave or pulsed laser to generate an optical signal at a desired wavelength. Exemplary optical signals to be processed have optical frequencies of about $2.3 \times 10^{14}$ Hertz to about $1.8 \times 10^{14}$ Hertz, i.e., a wavelength of about 1.3 microns to about 1.7 microns. In one example, a continuous wave optical signal having a wavelength of approximately 1.55 microns, i.e., a frequency of $1.93 \times 10^{14}$ Hertz, is generated by light source 101 and supplied via 102 to optical digital-to-analog converter 100. In optical digital-to-analog converter 100 the continuous wave optical signal is supplied via optical path 103 to splitter 104, which generates a plurality of N mutually coherent optical beams 105-1 through 105-N. The number N of the mutually coherent beams has to be at least two (2), but four (4) to eight (8) optical beams are typically employed. The importance of the plurality N of optical beams being mutually coherent in this application will be discussed below. In this example, splitter 104 is a multimode interference (MMI) coupler. The plurality N of mutually coherent optical beams are supplied on a one-to-one basis to a corresponding plurality of optical phase shifters 106-1 through 106-N, respectively. Also supplied via 112-1 through 112-N to phase shifters 106-1 through 106-N are bits, i.e., control signals, of a data sequence for causing the phase shifts in phase shifters 106-1 through 106-N to effect the desired digital-to-analog conversion. Thus, in this example, the digital-to-analog conversion is realized by use of an electro-optical phase shift modulation scheme through either direct phase shift modulation of the continuous wave optical beams from laser 101 or by an external phase shift modulation using, for example, a Mach Zehnder phase shift modulator. The frequency of the modulation signal is in the microwave/millimeter-wave range. The phase shift modulated outputs from phase shifters 106-1 through 106-N are supplied via optical paths 107-1 through 107-N, respectively, to optical combiner 108, where they are recombined to form the desired optical analog signal. In this example, combiner 108 is a multimode interference (MMD) coupler. This analog optical signal is supplied via optical paths 109 and 110 to linear photodiode 111, which yields an electrical signal for use as desired.

The recombined phase shift modulated optical signal being detected by photodiode 111 develops current $i_{PD}$ through photo diode 111, which is calculated as follows:

$$i_{PD} = RP_{in} \left| \sum_i \exp\left(j\pi \frac{V_i}{V_\pi}\right) \right|^2,$$

where R is the responsivity of photodiode 111, $P_{in}$ the launched optical power, $V_i$ the control voltage for the i-th phase shift modulator and $V_\pi$ the switching voltage for a phase shift modulator. If the control voltages are now configured such that each of them can have two different levels, namely, $V_{i,low}$ and $V_{i,hi}$, $2^i$ output current $i_{PD}$ levels are realizable. If the two different control voltage levels $V_{i,low}$ and $V_{i,hi}$ are switched between at a "high" rate an arbitrary waveform is developed at the output of photodiode 111. The so-called "high" rate is typically 10–40 Gbits/s, but could be as high as 160 Gbits/s.

The phase shift modulator 106 of each branch can be fabricated e.g. in a material system with linear electro-optic effect, as InP, GaAs or $LiNbO_3$. The effective refractive index of an optical waveguide changes in proportion to the applied electrical field perpendicular to this waveguide. A high frequency distributed electrical waveguide is engineered to co-propagate with the optical wave with matched propagating velocity to deliver the local electrical field with high modulation bandwidth. The different branches will delay the optical signal by a different length of time. This results in different phases at the outputs of phase shifters 106. In the combiner 108, these different output phase signals that interfere constructively have a different optical signal phase due to the different time delays these signals experienced. The resulting optical signal after the MMI coupler, i.e., combiner 108, is the sum of all the phase shifted optical signals that interfere constructively.

Figure 2:
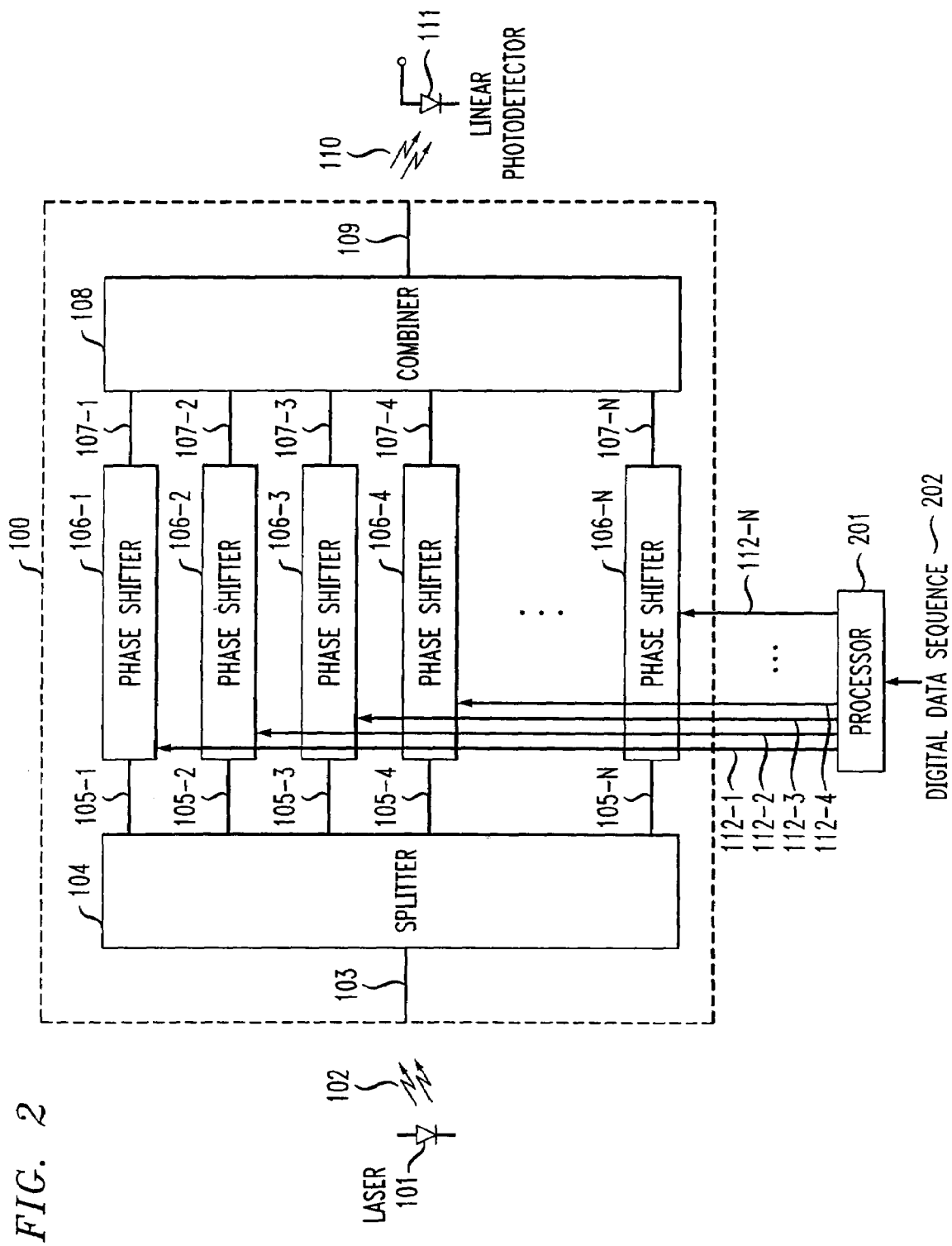
FIG. 2 also shows, in simplified block diagram form, a second embodiment of the invention.

FIG. 2 also shows, in simplified block diagram form, a second embodiment of the invention. The embodiment of FIG. 2 is similar to that of FIG. 1 and includes similar elements that are essentially identical from both a physical and functional standpoint. These similar elements have been similarly numbers as those in FIG. 1 and will not be discussed again in detail. The only significant difference between the embodiments of FIG. 1 and FIG. 2 is the use of processor 201. As can be seen, one or more data signals are supplied to processor 201 via input connection 202. In processor 201, the data signals are employed to code and generate control voltage signals for driving, phase shift modulators 106-1 through 106-N. These control voltage signals are supplied via output connections 112-1 through 107-N to phase shifters 106-1 through 106-N, respectively.

Figure 3:
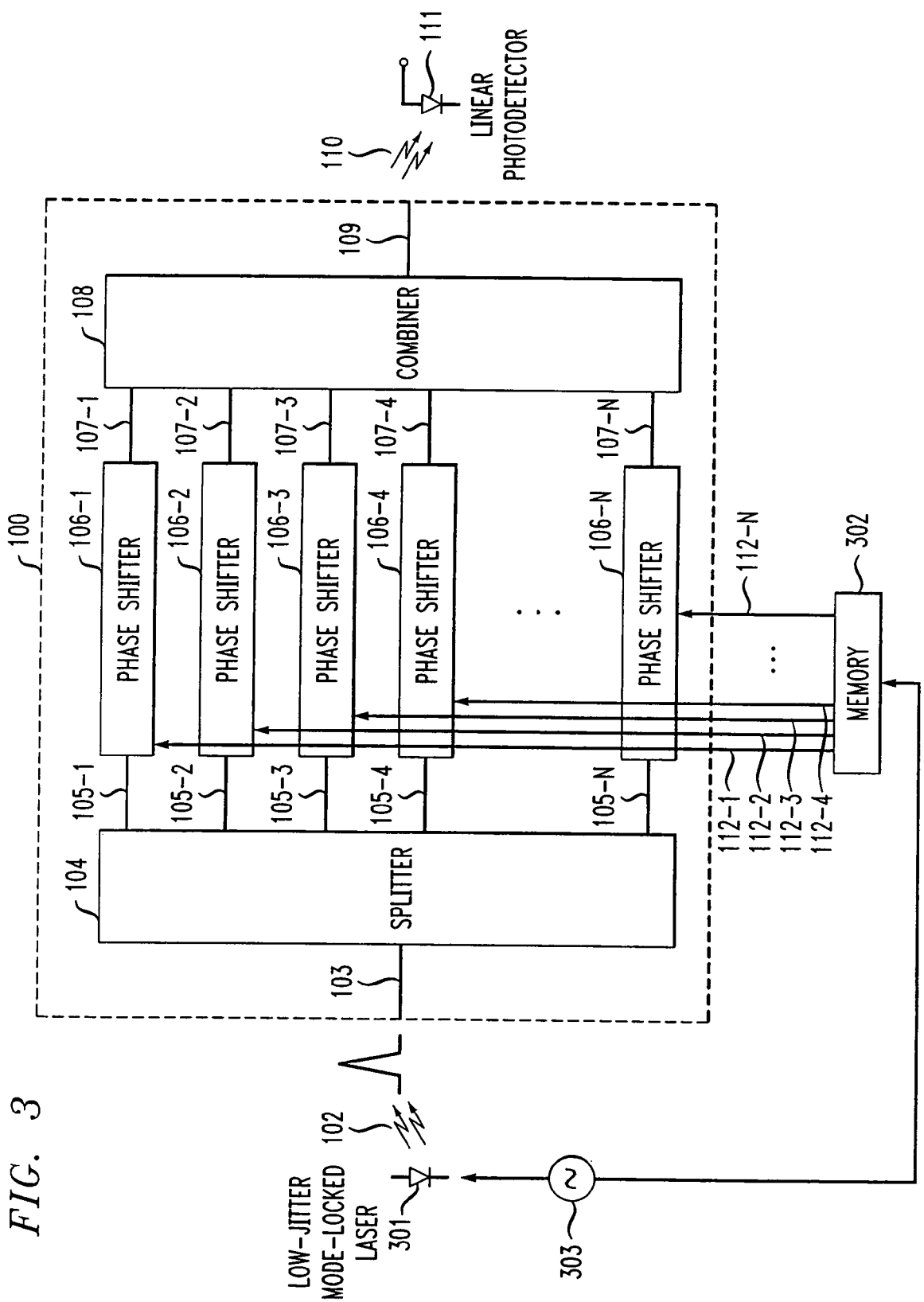
FIG. 3 illustrates, in simplified block diagram form, a third embodiment of the invention.

FIG. 3 illustrates, in simplified block diagram form, a third embodiment of the invention. The embodiment of FIG. 3 is also similar to that of FIG. 1 and includes similar elements that are essentially identical from both a physical and functional standpoint. These similar elements have been similarly numbers as those in FIG. 1 and will not be discussed again in detail. The only significant difference between the embodiments of FIG. 1 and FIG. 3 is that a pulsed laser signal is supplied as an input from pulsed laser 301 to the optical digital-to-analog converter 100, and that the pulsed laser optical signal 102 is controlled to have the same repetition rate as the data sequence from memory unit 302. The pulsed laser optical signal is split into a plurality of mutually coherent optical beams 105-1 through 105-N via splitter 104, which are phase shift modulated via phase shifters 106-1 through 106-N by data sequences stored in a memory to generate a substantially jitter free analog optical signal after the phase shift modulated optical beams are recombined. The pulsed laser optical signal 102 is controlled via clock 303 to have the same repetition rate as the data sequence from memory unit 302. By properly aligning the data sequence with the pulses of the pulsed laser optical signal, the effect of timing jitter is canceled.

Figure 4:
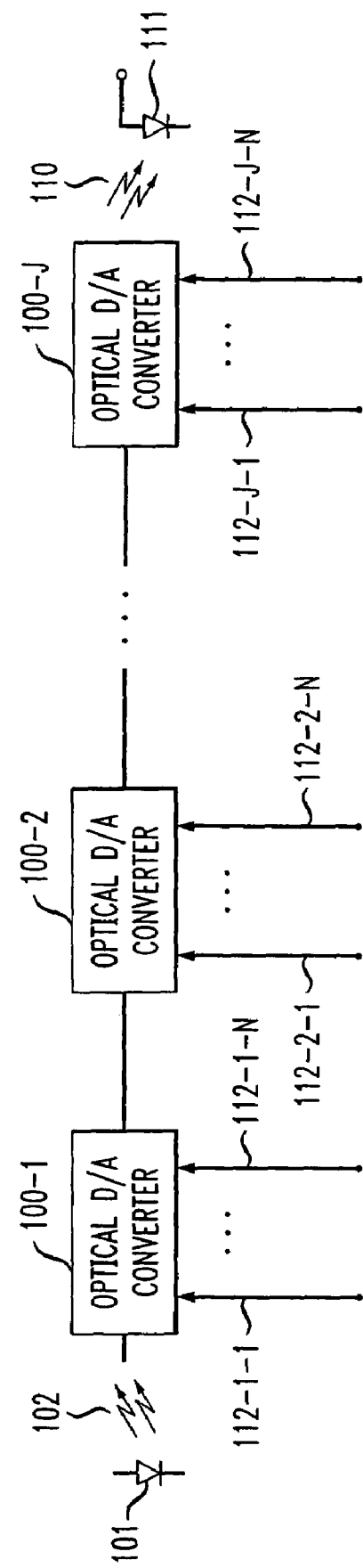
FIG. 4 shows, in simplified block diagram form, details of a fourth embodiment of the invention.

FIG. 4 shows, in simplified block diagram form, details of another digital-to-analog converter 100 in accordance with the invention. In this embodiment a plurality of digital-to-analog converter stages 100-1 through 100-J are cascaded in order to realize a desired number of phase shift modulated optical beams in obtaining the overall digital-to-analog conversion. As noted above at least two (2) branches are required in each stage with an overall number of stages being two (2) to four (4), i.e., between four (4) and eight (8) branches of optical beams to be phase shift modulated by the bits of the data sequence, i.e., the control voltage signals. This analog optical signal is supplied via optical paths 109 and 110 to linear photodiode 111, which yields an electrical signal for use as desired. This embodiment is advantageous to realize a desired distribution of discrete output levels.

The recombined phase shift modulated optical signal being detected by photodiode 111 develops current $i_{PD}$ through photodiode 111, which is calculated as follows:

$$i_{PD} = RP_{in} \prod_j \left| \sum_i \exp\left(j\pi \frac{V_{i,j}}{V_\pi}\right) \right|^2,$$

where j is the running index for the j-th stage.

The above-described embodiments are, of course, merely illustrative of the principles of the invention. Indeed, numerous other methods or apparatus may be devised by those skilled in the art without departing from the spirit and scope of the invention.

The invention claimed is:

1. A method of optically converting a digital signal to an analog signal, by employing a conversion module, comprising the steps of:

receiving a predetermined optical signal;

splitting the received optical signal into a plurality of mutually coherent optical beams;

supplying said plurality of optical beams on a one-to-one basis to a corresponding plurality of optical phase shifters;

supplying bits of a digital data sequence to said plurality of optical phase shifters for controlling the phase shift of the optical beams supplied to the individual ones of said plurality of phase shifters; and supplying said phase shifted optical beams to a combiner for recombining mutually coherent phase shifted optical beams, said combined mutually coherent phase shifted optical beams representing an optically converted digital-to-analog optical signal.

2. The method as defined in claim 1 wherein said plurality of optical phase shifters includes at least two (2) optical phase shifters.

3. The method as defined in claim 2 further including a step of generating a laser optical signal.

4. The method as defined in claim 3 wherein said step of generating said laser optical signal includes generating a continuous wave optical signal.

5. The method as defined in claim 4 further including a photodiode for detecting said recombined optical signal representing said optically converted digital-to-analog optical signal.

6. The method as defined in claims 5 wherein in response to said recombined mutually coherent optical signals said photodiode develops current $i_{PD}$ as follows:

$$i_{PD} = RP_{in} \left| \sum_i \exp\left(j\pi \frac{V_i}{V_\pi}\right) \right|^2,$$

where $i_{PD}$ is the photodiode current, R is the responsivity of the photodiode, $P_{in}$ is he launched optical power, $V_i$ is the control voltage for the i-th optical phase shift modulator developed in response to said bits of said digital data sequence and $V_{90}$ is the switching voltage for an optical phase shift modulator.

7. The method as defined in claim 6 further including configuring each of said control voltages $V_i$ so that each has two voltage levels, $V_{i,low}$ and $V_{i,hi}$, thereby generating $2^i$ output current $i_{PD}$ levels.

8. The method as defined in claim 7 further including switching said control voltage levels at a predetermined rate for generating an arbitrary waveform at an output of said photodiode.

9. The method as defined in claim 4 further including cascading aplurality of said conversion modules each including a predetermined plurality of optical phase shifters for generating said converted digital-to-analog optical signal.

10. The method as defined in claim 9 further including a photodiode for detecting said optically converted digital-to-analog optical signal.

11. The method as defined in claims 10 wherein in response to said recombined mutually coherent optical signals said photodiode develops current $i_{PD}$ as follows:

$$i_{PD} = RP_{in} \prod_j \left| \sum_i \exp\left(j\pi \frac{V_{i,j}}{V_\pi}\right) \right|^2,$$

where j is the running index for the j-th stage, $i_{PD}$ is the photodiode current, R is the responsivity of the photodiode, $P_{in}$ is he launched optical power, $V_{ij}$ is the control voltage for the i-th optical phase shift modulator in the j-th stage developed in response to said bits of said digital data sequence and $V_{90}$ is the switching voltage for an optical phase shift modulator.

12. The method as defined in claim 11 further including configuring each of said control voltages $V_{ij}$ so that each has two voltage levels, $V_{ij,low}$ and $V_{ij,hi}$, thereby generating $2^{ij}$ output current $i_{PD}$ levels.

13. The method as defined in claim 12 further including switching said control voltage levels at a predetermined rate for generating an arbitrary waveform at an output of said photodiode.

14. The method as defined in claim 3 wherein said step of generating said laser optical signal includes generating a pulsed optical signal.

15. The method as defined in claim 14 further including controlling said pulsed laser optical signal to have the same repetition rate as bits being supplied from a memory unit to control the phase shift of each of said optical phase shifters.

16. The method as defined in claim 15 further including a photodiode for detecting said recombined optical signal representing said optically converted digital-to-analog optical signal, and wherein in response to said recombined mutually coherent optical signals said photodiode develops current $i_{PD}$ as follows:

$$i_{PD} = RP_{in} \left| \sum_i \exp\left(j\pi \frac{V_i}{V_\pi}\right) \right|^2,$$

where $i_{PD}$ is the photodiode current, R is the responsivity of the photodiode, $P_{in}$ is he launched optical power, $V_i$ is the control voltage for the i-th optical phase shift modulator developed in response to said bits of said digital data sequence and $V_{90}$ is the switching voltage for an optical phase shift modulator.

17. The method as defined in claim 16 further including configuring each of said control voltages $V_i$ so that each has two voltage levels, $V_{i,low}$ and $V_{i,hi}$, thereby generating $2^i$ output current $i_{PD}$ levels.

18. The method as defined in claim 17 further including switching said control voltage levels at a predetermined rate for generating an arbitrary waveform at an output of said photodiode.

19. The method as defined in claim 1 wherein said plurality of optical phase shifters includes at least four (4) optical phase shifters.

20. The method as defined in claim 1 wherein said plurality of optical phase shifters includes at least eight (8) optical phase shifters.

* * * * *